Patented Jan. 2, 1940

2,185,472

UNITED STATES PATENT OFFICE 2,185,472

PECTIN AND ITS MANUFACTURE

Philip Bliss Myers, Scarsdale, N. Y., and William W. Cowgill, Fairfield, Conn., assignors to Sardik Incorporated, Jersey City, N. J., a corporation of Delaware No Drawing. Application October 8, 1937, Serial No. 167,936

8 Claims. (Cl. 260—210)

This invention relates to pectin, and an object of the invention is to protect pectin against decomposition or deterioration in the raw material before extraction therefrom, during the extraction thereof from the raw material, and during its subsequent storage in commercial form. This application is a continuation in part of our application Serial No. 34,218, filed August 1, 1935.

Although pectin occurs in most fruits and vegetables, it is usually obtained commercially from apple pomace which is the residue from the cider mill after the juice has been pressed from the apples, or from albedo which is the white part of citrus fruit. Pectin occurs in these materials in the form of protopectin, an insoluble compound believed by many to be a combination of pectin and cellulose.

In the manufacture of pectin from pomace or other pectic material it is necessary to liberate the pectin from the insoluble protopectin by chemical means. The usual procedure is to hydrolyze the protopectin into its constituents, pectin and cellulose, by heating the pomace with acidified water. The hydrolysis of the protopectin depends upon several factors, such as the length of time of the extracting operation, the temperature and the hydrogen ion concentration of the extracting medium. However, pectin itself is also hydrolyzed under these conditions, so that heretofore in order to obtain the most satisfactory results it has been necessary to so regulate these three factors that the hydrolysis of the protopectin is as great as possible and the hydrolysis of the pectin is kept as small as possible.

Such conditions of extraction have not permitted obtaining both the highest yield and the highest grade of pectin theoretically possible as the higher grades are only obtained at the lower extracting temperatures, while the highest yields are only obtained at the higher extracting temperatures. The trouble has resulted from the fact that although the hydrolysis of the protopectin to form pectin occurs rapidly at elevated temperatures, the hydrolysis of the pectin itself, and hence its decomposition also occurs rapidly at elevated temperatures.

It will be seen that the amount and grade of pectin obtained in a given operation are variable. The jelly grade of the pectin is the number of parts of sugar which one part of pectin will jell under standard conditions. Heretofore, when a process had been so carried on as to produce the highest yield of pectin from a given raw material, the grade of the pectin so produced has been low. On the other hand, when the process of preparing pectin has ben so controlled as to obtain the highest grade of pectin possible the yield has been too low for commercial success.

The value of an extraction process is determined by the number of jelly units obtainable from a pectic material, such as apple pomace or albedo. The term jelly-units is herein employed to designate the figure obtained by multiplying the jelly grade of the pectin by the percentage yield of pectin from the raw material. From this definition it is quite obvious that the greater the amount of jelly units obtainable from a definite weight of pectin material the greater the amount of jelly that may be made from the resulting pectin. For example, it was possible to obtain a 37.5% yield of pectin from a certain albedo in one extraction. This pectin was 181 grade so that the number of jelly units obtained from the albedo was 67.9. Altering the conditions of the extraction and employing the same albedo, a 10% yield of a 472 grade pectin was obtained so that the number of jelly units in this case was only 47.2. The quantity of jelly that may be made from the pectin extracted from a definite weight of pectic material is directly proportional to the number of jelly units obtained during the extraction. For example, in the two extractions cited above, where 67.9 and 47.2 jelly units were obtained, 11,312 and 7,867 pounds of a 60% sugar jelly, respectively, could be made from the pectin extracted from 100 pounds of albedo. In other words, 43.8% more jelly could be made from the 67.9 jelly unit extraction than from the extraction producing only 47.2 jelly units. Therefore the value of the pectin extracted from 100 pounds of albedo would be approximately 43.8% greater in the case of the 67.9 jelly unit extraction.

Obviously, the extraction process which produces the highest number of jelly units is the most economical one. Heretofore, so far as we know no extraction process has been known that will produce jelly units approaching the theoretical number contained in a pectic material as it has been impossible to obtain maximum yields of high grade pectin.

A further object of this invention is to provide an improved pectin extraction process capable of producing a relatively large number of jelly units.

These and other objects which will be apparent to those skilled in the art are attained by the present invention which comprises employing a suitable hydrolysis-inhibiting agent, as more fully set forth hereinafter, to prevent deterioration of the pectin by hydrolytic action either before, during or after extraction thereof from the raw material.

Although we prefer to use glycerine as the hydrolysis-inhibiting agent because of its ready availability, it will be apparent to those skilled in the art that other hydrolysis-inhibiting agents will be effective and can be used in place of glycerine. We have found, for example, that the derivatives of glycerine as well as any of the polyhydric alcohols or their derivatives are suitable and can be employed in place of glycerine in carrying out the present invention. Also, certain so-called "glycerine substitutes" which are well known in the art and are sold under various trade names can be employed.

Usually, after sufficient pomace has accumulated at a cider mill it is hauled to a kiln, which may be a considerable distance from the mill, and there dried to a moisture content of approximately 10% in order to permit the pomace being kept as long as possible or until such time as it may be desired for pectin manufacture. However, the raw material, even when properly dried, loses some of its jelly units if stored under normal atmospheric conditions. For this reason, it has always been customary to keep dried pomace in cold storage.

In applying the present invention to the protection of pectin in raw material, we have found that if the raw material such, for example, as pomace from the cider mill is soaked in a water solution of such a hydrolysis-inhibiting agent as glycerine, for example, for about one hour and again pressed, the jelly units in the pomace are approximately 50% greater than otherwise and the pomace can be kept for several days before drying without any appreciable loss of jelly units. The glycerine solution should contain from 3% to 4% glycerine. The soaking operation not only results in protection of the pectin but serves to remove a large percentage of soluble extraneous constituents, such as salts, acid, sugars and the like, and thus produces a more concentrated pomace than is normally obtained from a cider mill.

If desired, the pomace may be dried without the above described soaking treatment, and glycerine or other hydrolysis-inhibiting agent then sprayed on the dry pomace as it issues from the kiln.

Pomace containing glycerine, for example, can be kept at normal temperatures for as long as a year or more without appreciable loss of jelly units. It is not necessary to keep it in cold storage.

We have also found that the addition of a suitable agent such as glycerine to the extracting medium protects the pectin which is liberated during the extracting process, against hydrolysis even in boiling solutions without noticeably delaying the hydrolysis of the protopectin, so that maximum yields of high grade pectin can be obtained. The addition of the glycerine permits extracting operations even at 100° C., with acidified water having pH values which produce maximum yields of pectin. Ordinarily, under such conditions the destruction of the liberated pectin is so rapid that a large percentage of the jelly units is lost.

The amount of glycerine which it is necessary to add to the extracting medium in order to protect the pectin during the extracting operation will vary from a .25% to a 4.0% solution depending upon the weight of the pectin which is obtainable from the pomace. The amount of pectin obtainable from a given pomace may be readily determined by the usual well-known methods.

The addition of glycerine or the like to the extracting medium not only permits the use of boiling temperatures, but also less acid or higher pH values may be employed without any loss of jelly units. This is due to the fact that the hydrolysis-inhibiting agent protects the pectin from destruction so that the extraction period may be prolonged until maximum yields of pectin are obtained, resulting in a high yield of jelly units. As a result, excessive amounts of acid are not present in the pectin extract and therefore do not need to be subsequently eliminated.

The variation in the amount of glycerine or the like necessary to protect the pectin during its extraction depends upon the length of the extraction period, the pH of the extracting medium and the temperature at which the operation is conducted. In general, the longer the extraction period, the lower the pH of the extracting medium and the higher the temperature, the more glycerine or other agent is required.

The pectin extract is then subjected to clarifying treatment in accordance with known methods, after which it usually contains from .25% to 1.0% pectin. Such a dispersion is too weak for practical purposes and must be concentrated to a 3% to 4% solution. Heretofore this concentrating step has usually required expensive equipment including vacuum evaporators to permit evaporation at a comparatively low temperature, such as 60° C. or less, for the purpose of protecting the pectin against the rapid hydrolysis produced by higher temperatures.

We have found that the presence of glycerine, for example, in the pectin extract permits the concentrating operation to be conducted in ordinary open kettles at 100° C. without appreciable loss of pectin due to hydrolysis. The glycerine may either be added to the pectin extract, or, if the extracting operation has been effected in the presence of glycerine as above described it will already be present.

We prefer to conduct the concentrating operation with the extract at a pH value equal to 3.0 or above. If the pH value is below 3.0 the excessive acidity should be neutralized by the addition of an alkali, such as ammonia or calcium carbonate. When the desired pH value is obtained, if the glycerine is not already present as a result of its employment in the previous extracting step, it may be added in an amount equal to approximately one-half of the amount of the pectin present. For example, if the pectin extract contains approximately .5% pectin, glycerine is added until the solution contains approximately .25% glycerine by weight. With the glycerine or the like present the extract can be concentrated to any desired point by boiling in an open kettle and there will be no appreciable deterioration of pectin by hydrolysis. If for any reason it is necessary to carry out the concentrating operation at a pH value below 3.0, a higher percentage of glycerine or other agent must be employed.

Heretofore the pectin concentrate, prepared without glycerine or other agent, has suffered a noticeable loss in jellying power after a storage of three to four months, even though packed in sterilized bottles, and such deterioration has occurred more rapidly in warm climates. Also, when a bottle of ordinary pectin concentrate is opened to the atmosphere it will spoil if not used immediately.

We have found that a pectin concentrate made in accordance with the above described process and containing glycerine or the like in an amount equal to approximately one-half the amount of pectin present may be stored for periods up to one year or more without any appreciable loss in the jellying power of the pectin, and also that such concentrate may be open to the atmosphere for several days before any substantial loss of jellying power is apparent.

Pectin concentrates which do not already contain glycerine or other agent may be protected against deterioration by the addition of glycerine or the like thereto in an amount equal to approximately one-half the amount of pectin present. For example, if the concentrate contains 4.0% pectin, approximately 2.0% glycerine should be added, assuming that the pH of the concentrate is at 3.0 or above. For concentrates having lower pH values, slightly more glycerine should be added.

In commerce, pure pectin is usually distributed in dry form as a powder prepared by precipitating pectin from the liquid concentrate, drying and grinding the precipitate, or, more recently, as flakes or a film prepared by drum drying. Although conventional dry pectin is more resistant to deteriorating influences than ordinary pectin concentrates as heretofore prepared, it, nevertheless, deteriorates with time, particularly if the pH value of the pectin is within the jelly-forming range, that is, equal to 3.5 or less. The lower the pH value the more rapidly does the pectin deteriorate, and this deterioration occurs even though the pectin contains no soluble salts or free acid, although the deterioration is more rapid if such materials are present with the pectin.

Inasmuch as the most important use for pectin is in the manufacture of jelly, the making of which requires the mixing of pectin, acid and sugar, it is highly desirable to combine dry pectin with an acid, such, for example as malic, tartaric or lactic acid so that the material can be used to form jelly merely by combining with it a suitable sugar solution. Various forms of pectin-acid combinations for jelly making have been attempted, but have not been particularly successful commercially because in such combinations the acid produces hydrolysis of the pectin so rapidly that within a short time the jellying power of the pectin in the mixture is appreciably lowered and may be completely destroyed in a relatively short time.

We have found that the presence of glycerine or the like in a dry pectin-acid combination, either in powder or film form, inhibits the hydrolysis of the pectin and protects it against loss of jellying power over long periods of time, sometimes as much as a year or more. The use of glycerine, for example, for this purpose makes it possible for the first time to mix acid in any amount with the pectin without a loss of jellying power. When glycerine or its equivalent is present, salts, acid and moisture have substantially no destructive effect on the pectin. We have stored dry pectin film containing the proper amount of glycerine together with 30% to 40% acid, soluble salts and the like, over long periods of time under such conditions that it absorbed from 10% to 20% moisture, and there has been substantially no loss in jellying power.

The amount of glycerine necessary to protect the dry pectin varies from one to two parts of glycerine for every three parts of pectin. For example, a pectin-acid mixture, having a pH value of 2.6 requires 1.5 parts of glycerine for every three parts of pectin. If the glycerine is already present in the pectin concentrate, due to the preparation thereof in the manner described hereinabove, and the concentrate is dried to produce dry pectin, it will not be necessary to add additional glycerine to the dry product as the glycerine present in the concentrate carries over in full amount during the drying operation and remains with the pectin protecting the same against deterioration both during and after the drying step. If the pectin concentrate has been prepared without the use of glycerine, then the glycerine should be added thereto prior to the drying operation. It may also be incorporated in dry pectin to produce the desired result.

It will be apparent that the present invention can be variously modified and adapted within the scope of the appended claims.

We claim:

1. The method of protecting a pectic raw material against deterioration which consists in adding 1% to 4% glycerine thereto.

2. The method of protecting a pectic raw material against deterioration which consists in washing said raw material in a 2% aqueous solution of glycerine and then drying the material.

3. The method of protecting dried pectic raw material against deterioration which consists in adding 3% to 4% glycerine thereto.

4. The method of preventing the loss of jelly units from pectic raw material which consists in soaking said material in a 3% to 4% aqueous solution of glycerine and then drying said material.

5. The method of preventing the loss of jelly units from pectic raw material which consists in soaking said material in a 3% to 4% aqueous solution of glycerine for approximately one hour, and then pressing said material and drying it.

6. The method of extracting pectin from pectic raw material which consists in adding the material to an acidified water, incorporating glycerine therein in an amount sufficient to prevent hydrolysis of the pectin during the subsequent heating operation, heating to hydrolyze the protopectin in the material and form pectin, and then separating the pectin therefrom.

7. The method of extracting pectin from pectic raw material which consists in adding the material to an acidified water, incorporating glycerine therein in an amount sufficient to prevent hydrolysis of the pectin during the subsequent heating operation, heating to hydrolyze the protopectin in the material and form pectin, concentrating the pectin extract, drying the pectin, and maintaining glycerine present in an amount equal to approximately 50% of the pectin during the concentrating and drying steps.

8. The method which consists of incorporating glycerine in pectin-containing raw material, and subsequently extracting pectin from said raw material and concentrating the extract while maintaining glycerine present in an amount equal to substantially 50% of the available pectin.

PHILIP BLISS MYERS.
WILLIAM W. COWGILL.